(12) United States Patent
Yamazaki et al.

(10) Patent No.: US 8,537,667 B2
(45) Date of Patent: Sep. 17, 2013

(54) PACKET TRANSFER DEVICE, PACKET TRANSFER METHOD, PACKET TRANSFER PROGRAM AND COMMUNICATION DEVICE

(75) Inventors: Yusuke Yamazaki, Tokyo (JP); Masaki Tashiro, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 259 days.

(21) Appl. No.: 12/588,610

(22) Filed: Oct. 21, 2009

(65) Prior Publication Data

US 2010/0098083 A1 Apr. 22, 2010

(30) Foreign Application Priority Data

Oct. 22, 2008 (JP) .................. 2008-272360

(51) Int. Cl.
*H04L 12/28* (2006.01)

(52) U.S. Cl.
USPC ........... 370/230; 370/401; 709/227; 709/246; 709/249; 726/3

(58) Field of Classification Search
None
See application file for complete search history.

(56) References Cited

U.S. PATENT DOCUMENTS

| | | | | |
|---|---|---|---|---|
| 6,058,431 A | * | 5/2000 | Srisuresh et al. | 709/245 |
| 6,430,619 B1 | * | 8/2002 | Sitaraman et al. | 709/225 |
| 6,529,955 B1 | * | 3/2003 | Sitaraman et al. | 709/225 |
| 7,272,649 B1 | * | 9/2007 | Shively et al. | 709/225 |
| 7,369,563 B2 | * | 5/2008 | Choi et al. | 370/401 |
| 7,522,617 B2 | * | 4/2009 | Ogawa | 370/401 |
| 2003/0065817 A1 | * | 4/2003 | Benchetrit et al. | 709/245 |
| 2003/0200318 A1 | * | 10/2003 | Chen et al. | 709/227 |
| 2006/0109839 A1 | * | 5/2006 | Hino et al. | 370/352 |
| 2008/0075085 A1 | * | 3/2008 | Tsuge et al. | 370/392 |

OTHER PUBLICATIONS

P. Srisuresh et al, "IP Network Address Translator (NAT) Terminology and Considerations," Lucent Technologies, Aug. 1999, The Internet Society (1999).

* cited by examiner

*Primary Examiner* — Brian Roberts
(74) *Attorney, Agent, or Firm* — Rabin & Berdo, P.C.

(57) ABSTRACT

A packet transfer device includes: an address conversion unit that allocates a global address to a plurality of private addresses of the plurality of private networks and converts address information and a port number included in a header of a received packet;
a transfer unit that transfers a packet having the address information and the port number which are converted by the address conversion unit; and a session restriction unit that manages a number of sessions between a user terminal in the plurality of private networks and a device in the global network for each predetermined group and, when the number of sessions is greater than a number of available sessions which is set to each group, restricts the session of the user terminal which belongs to the group having the excess number of sessions.

2 Claims, 9 Drawing Sheets

FIG.4

| PRE-CONVERSION TRANSMITTING ADDRESS | PRE-CONVERSION TRANSMITTING PORT | POST-CONVERSION TRANSMITTING ADDRESS | POST-CONVERSION TRANSMITTING PORT |
|---|---|---|---|
| 172.16.0.1 | 100 | 200.100.0.1 | 2001 |
| 172.16.0.1 | 101 | 200.100.0.1 | 2002 |
| ... | ... | ... | ... |
| 172.16.0.2 | 5000 | 200.100.0.1 | 2501 |
| 172.16.0.2 | 8000 | 200.100.0.1 | 2502 |
| ... | ... | ... | ... |

FIG.5

| GROUP | AVAILABLE SESSION NUMBERS | AVAILABLE PORT RANGE | RESTRICTION ADDRESS | CURRENT SESSION NUMBERS |
|---|---|---|---|---|
| #1 | 500 | NO. 2001-2500 | 172.16.0.1/32 | 105 |
| #2 | 500 | NO. 2501-3000 | 172.16.0.2/32 | 20 |
| ... | ... | ... | ... | ... |

FIG.8

| GROUP | AVAILABLE SESSION NUMBERS | AVAILABLE PORT RANGE | RESTRICTION ADDRESS | CURRENT SESSION NUMBERS | PARENT NUMBER |
|---|---|---|---|---|---|
| #1 | 500 | NO. 2001-2500 | 172.16.0.1/32 | 100 | #4 |
| #2 | 500 | NO. 2501-3000 | 172.16.0.2/32 | 500 | #4 |
| #3 | 1000 | dynamic allocation | 172.16.0.3/32 | 400 | #4 |
| #4 | 10000 | dynamic allocation | 200.100.0.100/24 | 1000 | - |
| ... | ... | ... | ... | ... | ... |

PACKET TRANSFER DEVICE, PACKET TRANSFER METHOD, PACKET TRANSFER PROGRAM AND COMMUNICATION DEVICE

BACKGROUND OF THE INVENTION

1. Field of the Invention

The present invention relates to a packet transfer device, a packet transfer method, a packet transfer program and a communication device.

2. Description of the Related Art

Internet service provider (ISP) provides an environment for connecting an IP network using a network address conversion function disclosed in Non-Patent Document 1, for example.

The method for connecting a network in related art will be described with reference to FIG. 2. In FIG. 2, a user A, a user B and a user C respectively have a contract for a connection with an ISP 114, CPEs (customer premises equipments) 108 to 110 such as a modem for connecting to a router 115 of the ISP 114 are installed in home networks (HNW) 111 to 113 of the respective users A to C.

The CPEs 108 to 110 have a network address conversion function. The network address conversion function is for allocating a single global IP address to a private IP address of user's terminal and managing the relationship between the private IP address and the global IP address so that the terminal can connect to the Internet.

[Non-Patent Document 1] RFC2663

SUMMARY OF THE INVENTION

As described the above, in the related art, a single global IP address is allocated to a single user. When there is a shortage of IP addresses serving as global addresses, it is difficult to hold a new user since the ISP may not use the global IP addresses.

As a solution of the shortage of IP addresses, usage of IPv6 addresses as the global addresses has been considered. However, because of reason such that IPv4-compliant devices are widely spread, some say that it may be not preferable to force to switch to IPv6 addresses and it is expected that the IPv4 addresses will be continuously used.

In order to delay the shortage of the global addresses at a maximum degree, a usage of an NAPT (network address port translation) function has been considered.

FIG. 3 is a configuration diagram showing a network configuration which is assumed when an NAPT function is applied to an ISP network configuration in related art.

In FIG. 3, a router 215 of an ISP 214 has the NAPT function. The NAPT function is for converting a plurality of private addresses in the ISP into a single global address. The plurality of private addresses are managed by being associated with TCP port numbers. Using the mechanism of the NAPT function, a communication between a terminal and the Internet 216 can be realized.

However, as shown in FIG. 3, in a case where a single global address is shared by a plurality of users, the total of port numbers used for the single global address is limited to 65,535.

Thus, when a multisession is employed and many port numbers are used exclusively by a single user, terminals of other users using the same global address may not secure the port number. In such a case, the terminals of other users may not use port numbers and those terminals may not connect to the Internet. This causes unfairness among the users using the same global address.

Thus, there is a need for a packet transfer device, a packet transfer method, a packet transfer program and a communication device which are capable of maintaining fairness among users for accessibility to a communication path provided by the ISP when the ISP communication device uses an NAPT function and connects a plurality of users to the network at the same time.

According to an embodiment of the present invention, there is provided a packet transfer device for transferring a packet between a plurality of private networks and a global network, the packet transfer device includes: an address conversion unit that allocates a global address to a plurality of private addresses of the plurality of private networks and converts address information and a port number included in a header of a received packet; a transfer unit that transfers a packet having the address information and the port number which are converted by the address conversion unit; and a session restriction unit that manages a number of sessions between a user terminal in the plurality of private networks and a device in the global network for each predetermined group and, when the number of sessions is greater than a number of available sessions which is set to each group, restricts the session of the user terminal which belongs to the group having the excess number of sessions.

According to another embodiment of the present invention, there is provided a packet transfer method of a packet transfer device for transferring a packet between a plurality of private networks and a global network, the packet transfer method includes the steps of: allocating a global address to a plurality of private addresses of the plurality of private networks and converting address information and a port number included in a header of a received packet by an address conversion unit; transferring the packet having the address information and the port number which are converted by the address conversion unit by a transfer unit; and managing a number of sessions between a user terminal in the plurality of private networks and a device in the global network for each predetermined groups and, restricting the session of the user terminal which belongs to the group having the excess number of sessions by a session restriction unit when the number of sessions is greater than a number of available sessions which is set to each group.

According to another embodiment of the present invention, there is provided a packet transfer program of a packet transfer device for transferring a packet between a plurality of private networks and a global network, the packet transfer program controls a computer to execute: allocating a global address to a plurality of private addresses of the plurality of private networks and converting address information and a port number included in a header of a received packet by an address conversion unit; transferring the packet having the address information and the port number which are converted by the address conversion unit by a transfer unit; and managing a number of sessions between a user terminal in the plurality of private networks and a device in the global network for each predetermined groups and, restricting the session of the user terminal which belongs to the group having the excess number of sessions by a session restriction unit when the number of sessions is greater than a number of available sessions which is set to each group.

According to another embodiment of the present invention, there is provided a communication device includes a packet transfer device that transfers a packet between the plurality of private networks and the global network: the packet transfer device includes: an address conversion unit that allocates a global address to a plurality of private addresses of the plurality of private networks and converts address information and a port number included in a header of a received packet; a transfer unit that transfers a packet having the address information and the port number which are converted by the address conversion unit; and a session restriction unit that manages a number of sessions between a user terminal in the plurality of private networks and a device in the global network for each predetermined group and, when the number of sessions is greater than a number of available sessions which is set to each group, restricts the session of the user terminal which belongs to the group having the excess number of sessions.

According to the present invention, a network connection can be fairly provided to the plurality of users even when a single global address is allocated to the plurality of private addresses and the address information is converted. Further, according to the present invention, it is also possible to conserve the usage of global addresses.

BRIEF DESCRIPTION OF THE DRAWINGS

FIG. 4 is a configuration diagram showing a configuration of an NAPT table according to the first embodiment;

FIG. 5 is a configuration diagram showing a configuration of a session management table according to the first embodiment;

FIG. 8 is a configuration diagram showing a configuration of a session management table according to a second embodiment.

DETAILED DESCRIPTION OF EMBODIMENT

Hereinafter, preferred embodiments of the present invention will be described in detail with reference to the appended drawings. Note that, in this specification and the appended drawings, structural elements that have substantially the same function, and repeated explanation of these structural elements is omitted.

(A) First Embodiment

Hereinafter, a first embodiment of a packet transfer device, a packet transfer method, a packet transfer program and a communication device according to the first embodiment of the present invention will be described with reference to the drawings.

(A-1) Configuration of First Embodiment

Figure 1:
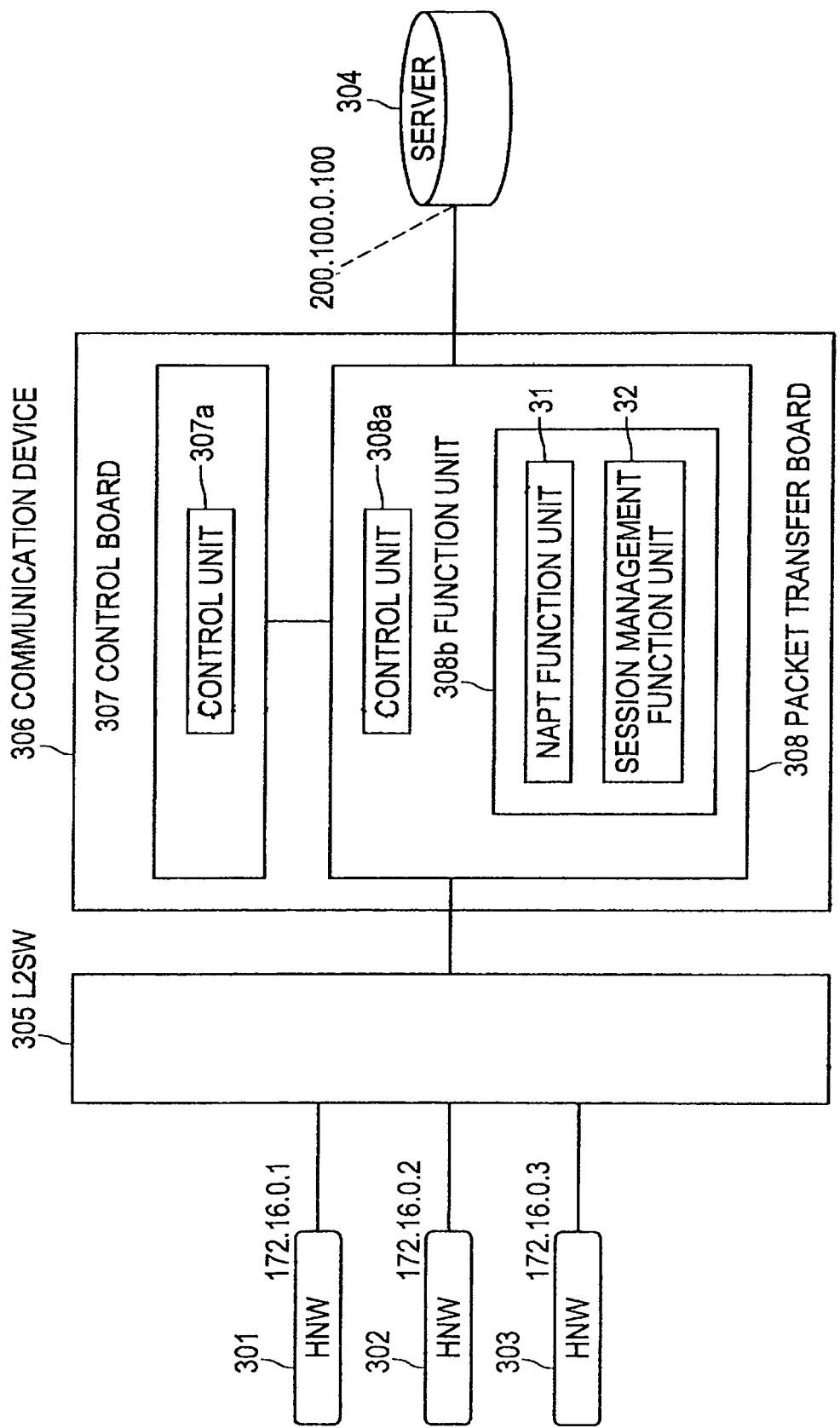
FIG. 1 is a configuration diagram showing a network configuration and an internal configuration of a communication device according to a first embodiment.
Figure 2:
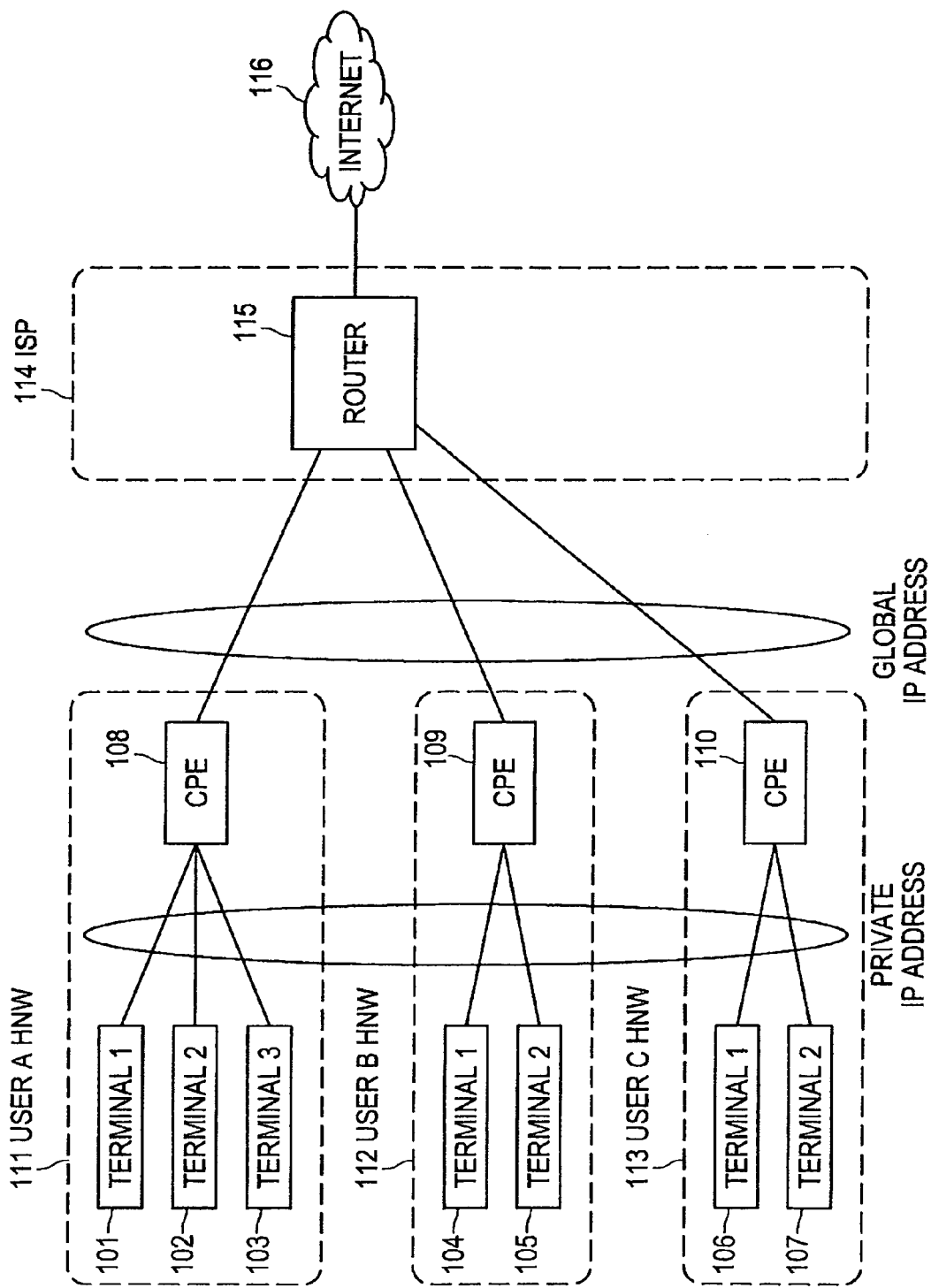
FIG. 2 is an explanatory diagram of an address conversion function in related art.
Figure 3:
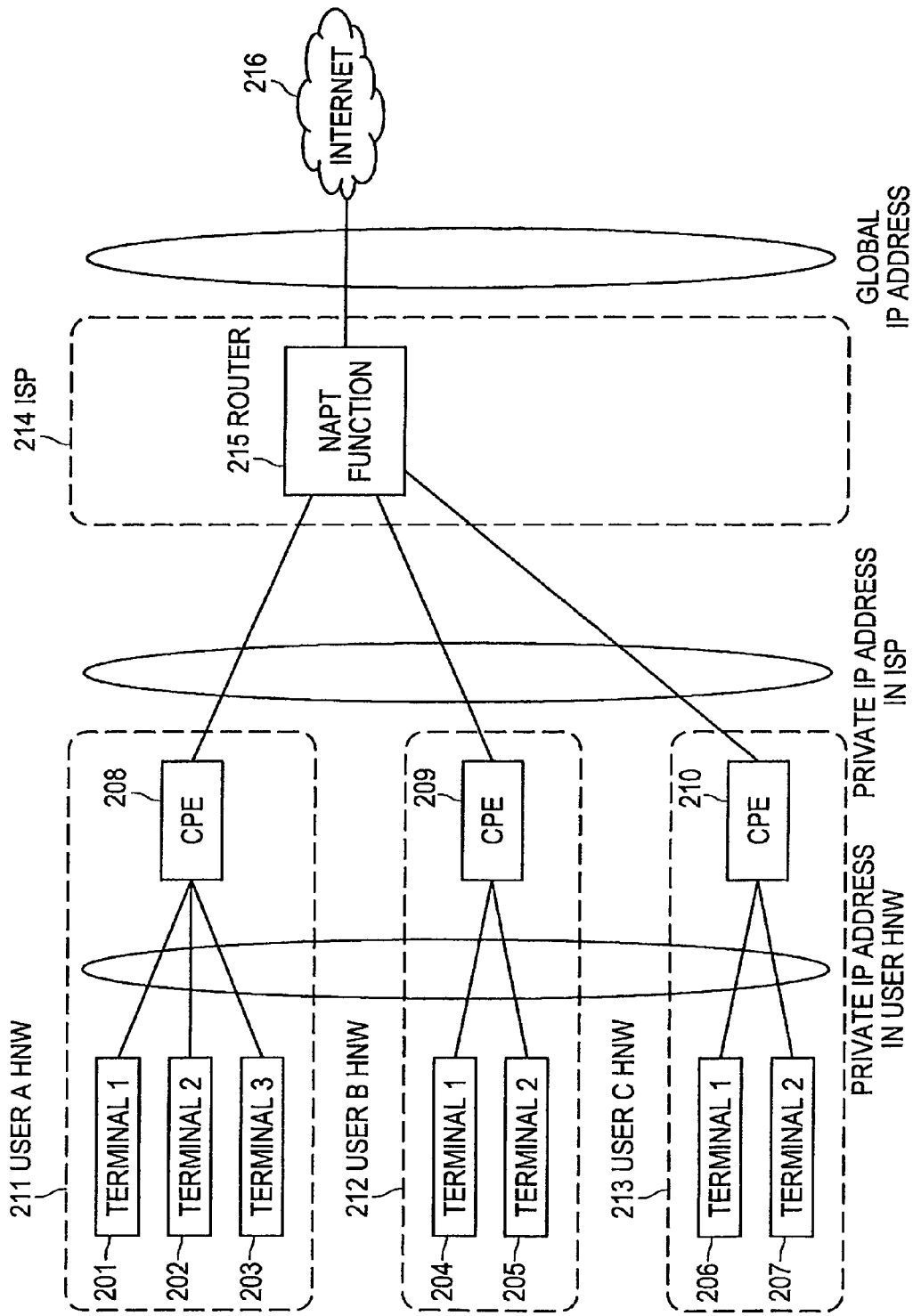
FIG. 3 is a configuration diagram of a network on an assumption that an address is converted using an NAPT function.

FIG. 1 is a configuration diagram showing a network configuration and an internal configuration of an ISP communication device according to the first embodiment.

As shown in FIG. 1, a main configuration of a network of the first embodiment includes at least HNWs (home networks) 301 to 303 of users, a L2SW (layer 2 switch) 305, an ISP communication device 306 and a server 304.

The HNWs 301 to 303 are home networks of users who have a contract for the Internet connection and are networks used to transfer user packets to terminals in the HNWs 301 to 303. In FIG. 1, the HNWs 301 to 303 are shown as three networks; however, the number of the networks is not limited to three.

The HNWs 301 to 303 are, for example, in-home networks of users. In order to simplify the description, in FIG. 1, the detail configurations of the HNWs 301 to 303 are omitted and the HNWs 301 to 303 includes terminals of the users (personal computers, for example) and CPEs (modems or routers, for example) and the like. Further, the terminals composing the HNWs 301 to 303 are configured to be connected to the communication device 306 via the L2SW 305.

The L2SW 305 is a relay device for relaying packets transmitted and received between the HNWs 301 to 303 and the communication device 306.

The communication device 306 is a communication device provided in the ISP and is a router, for example. The communication device 306 is configured to transfer a user packet received from the HNWs 301 to 303 via the L2SW 305 to the server 304 in the Internet or transfer a packet from the server 304 to the HNWs 301 to 303. With this configuration, the terminals of the contract users can connect to the Internet.

Further, the communication device 306 internally includes a control board 307 and a packet transfer board 308 and transfers a packet after converting a transmitting address (private IP address) and a global IP address of the user packet.

The control board 307 is a control board for controlling functions of the communication device 306 and internally includes a control unit 307a. The control unit 307a is configured to transmit control packets to a control unit 308a of the packet transfer board 308 to perform setting of a function unit 308b of the packet transfer board 308.

The packet transfer board 308 is a communication board for performing the transfer process in the communication device 306 and configured to transfer a user packet received from the HNWs 301 to 303 via the L2SW 305 to the server 304 or transfer a packet from the server 304 to the HNWs 301 to 303. Further, the packet transfer board 308 has the control unit 308a and the function unit 308b.

The control unit 308a transmits and receives the control packets to and from the control unit 307a of the control board 307 to perform an operation setting of the function unit 308b of the packet transfer board 308. The control unit 308a transfers a packet having the address information and the port number which are converted by an NAPT function unit 31 which will be described later (corresponding to function of a transfer unit).

The function unit 308b is configured to functionally execute a packet transfer under the control of the control unit 308a and includes at least the NAPT function unit 31 and a session management function unit 32.

The NAPT function unit 31 is configured to convert private IP addresses and port numbers of the transmitting terminals in the HNWs 301 to 303 into a single global IP address and a single port number. The NAPT function unit 31 has a NAPT table which associates IP addresses and port numbers of the HNW 301 to 303 with a converted virtual IP address and a converted virtual port number. With reference to this NAPT table, the NAPT function unit 31 performs an address conversion function (corresponding to function of the address conversion unit). With this configuration, a single global IP address can be shared among plural users.

FIG. 4 is a configuration diagram showing a configuration example of the NAPT table. As shown in FIG. 4, the NAPT table includes items of "pre-conversion transmitting address," "pre-conversion transmitting port," "post-conversion transmitting address," and "post-conversion transmitting port."

In the "pre-conversion transmitting address," private IP addresses of transmitters in the HNWs 301 to 303 are stored. In the "pre-conversion transmitting port," port numbers of the transmitters in the HNWs 301 to 303 are stored. In the "post-conversion transmitting address," global IP addresses are stored. In the "post-conversion transmitting port," port numbers set by a later described session management function unit 32 are stored.

The session management function unit 32 is configured to manage sessions from a transmitter to a destination.

Further, the session management function unit 32 manages the number of sessions available to the transmitters and performs a session restriction function for restricting the number of sessions (corresponding to function of the session control unit).

Specifically, the session management function unit 32 sets a region of port numbers available to the respective private IP addresses of transmitters in the HNWs 301 to 303 and uses the region as a group. Then, the session management function unit 32 sets the number of sessions available to each group and, when the number of current sessions in a group becomes greater than the number of available sessions of the group, the session management function unit 32 restricts a session process of the group. In this manner, the port numbers which can be used in each group are set and the number of available sessions is determined so that the fairness among the uses sharing one global IP address can be maintained.

FIG. 5 is a configuration diagram showing a configuration of a session management table managed by the session management function unit 32. In FIG. 5, the session management table includes items of "group," "available session numbers," "available port range," "restriction address" and "current session numbers."

In the "group," group numbers are stored. In the "available session numbers," the number of available sessions, which are set to each group, are stored. For example, the "available session numbers" of the "group #1" is set to "500" in FIG. 5.

In the "available port range," ranges of available port numbers, which are set to each group, are stored. For example, the "available port range" of the "group #1" is set to the port numbers of "2001 to 2500" in FIG. 5. Here, the range of the port numbers may be dynamically allocated.

In the "restriction address," IP addresses belonging to each group are stored. The IP address is a user-side transmitting address which can be seen by the ISP communication device 306. In other words, the user-side IP addresses allocated by the ISP communication device 306 are stored. For example, the "restriction address" of the "group #1" is set to the IP address of the HNW 301 side, that is, "172.16.0.1/32" in FIG. 5. Here, it is preferable that a single restriction address is set to a single group; however, plural restriction addresses may be set to a single group.

In the "current session numbers," the number of sessions currently executed using the IP addresses stored in the restriction address is stored. For example, the "current session numbers" of the "group #1" indicates "105" in FIG. 5.

(A-2) Operation of First Embodiment

Next, an operation for restricting the number of sessions executed in the communication device 306 according to the first embodiment will be described with reference to the drawings.

The following description exemplifies a flow of a communication starting from a terminal (not shown) in the HNW 301 to the server 304.

Firstly, when a user contracts with the ISP for the Internet connection, a session management table is created based on the content of the contract and set to the packet transfer board 308. Here, groups which are used to restrict the ports for each user-side private IP addresses allocated in the ISP are created and, as the number of available sessions is set to the respective groups, ranges of available port numbers are set.

When the terminal in the HNW 301 transmits a packet addressed to the server 304, the terminal of the HNW 301 makes a request a DNS (domain name system) server for an IP address corresponding to an FQDN (fully qualified domain name) name that uniquely identifies the server 304 based on a host name and a domain name and obtains the IP address of the server 304.

Next, the terminal in the HNW 301 transmits a packet using the obtained IP address of the server 304 as a destination address. When the packet transmitted from the terminal in the HNW 301 is given to a CPE in the HNW 301, the CPE rewrites the transmitting address of this packet to a private IP address allocated in the ISP and then the packet is transferred.

The packet transmitted from the CPE is given to the packet transfer board 308 of the communication device 306 via the L2SW 305.

Figure 6:
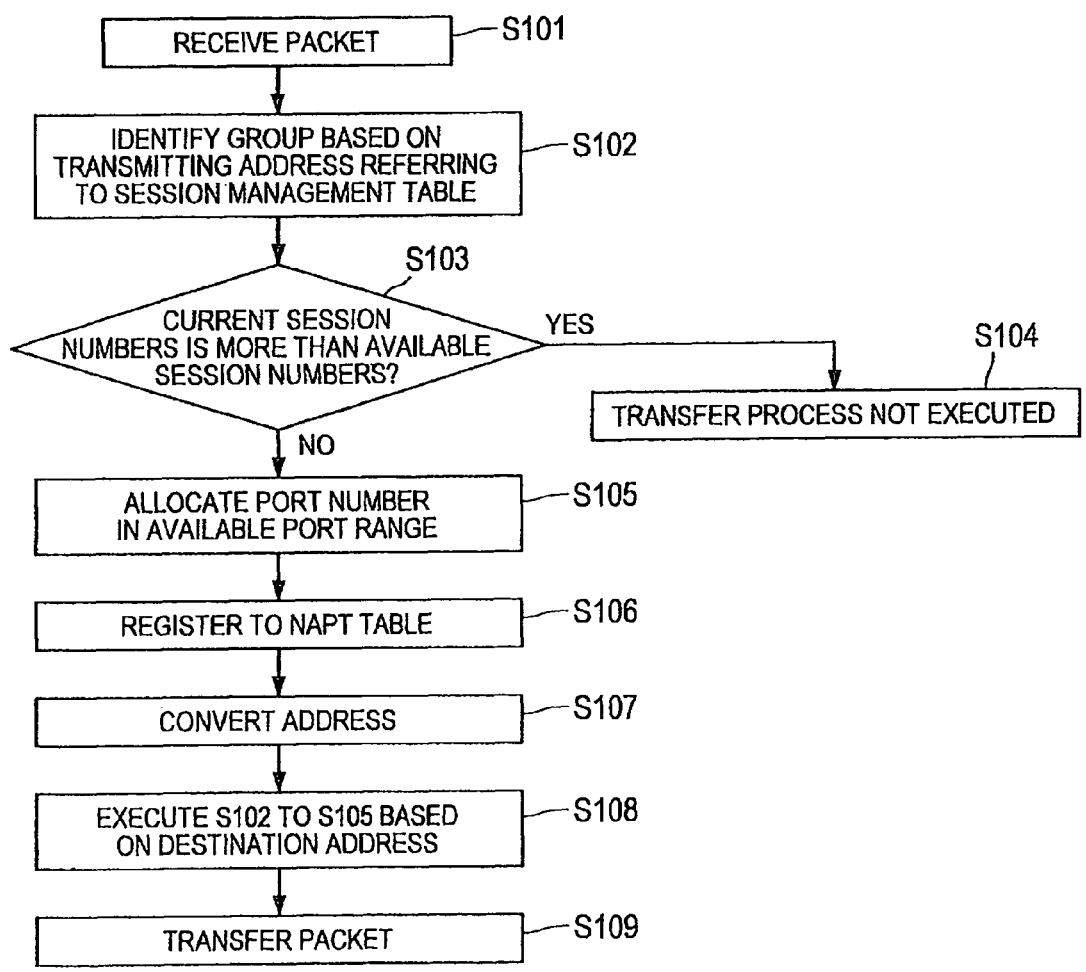
FIG. 6 is a flowchart showing a process in a packet transfer board according to the first embodiment.

When the packet is given to the packet transfer board 308, the function unit 308b performs a session restriction process shown in FIG. 6. FIG. 6 is a flowchart showing the session restriction process performed by the function unit 308b of the packet transfer board 308.

In FIG. 6, when the packet transfer board 308 receives the packet (step S101), the session management function unit 32 refers to the session management table based on the transmitting address included in a header of the packet and finds a group having the transmitting address as a restriction address (step S102).

When the session management function unit 32 identifies the group, the session management function unit 32 determines whether the number of current sessions of the group is greater than the number of available sessions (step S103).

When the number of current sessions is greater than the number of available sessions, the session management function unit 32 does not perform the transfer process of the packet which has the restriction address as the transmitting address (step S104).

In this manner, since the number of ports available to the users can be restricted by restricting the sessions of the users when the number of current sessions is greater than the number of available sessions, it can be avoided that one of the users exclusively keeps the global IP address and chances to connect to the network can be fairly shared by other users. It is also possible to conserve global IP addresses.

On the other hand, when the number of current sessions is not greater than the number of available sessions, the session management function unit 32 allocates a port number in the available port range of the group (step S105) and registers the port number to the NAPT table (step S106).

With this configuration, the NAPT table associates the transmitting address (private IP address) and the port number of the received packet with the global IP address and the port number allocated in step S105.

The following description will exemplify a case where a packet is given from the terminal in HNW 301. Since the private IP address is "172.16.0.1," the session management function unit 32 checks the information of the "group #1" in the session management table (see FIG. 5). Then, since it is found that the number of current sessions is "105" based on the information of the "group #1," the session management function unit 32 determines that the number of current sessions is not greater than the number of available sessions of "500." Thus, in this case, the session management function unit 32 allocates a port number randomly from the available port range "2001 to 2500." Here, for example, it is assumed that the port number "2001" is allocated and the session management function unit 32 registers the port number "2001" to the NAPT table.

In the above example, since the port number "2001" is allocated, as shown in the first line of the NAPT table of FIG. 4, the session management function unit 32 registers by associating with "pre-conversion transmitting address: 172.16.0.1," "pre-conversion transmitting port: 100," "post-conversion transmitting address: 200.100.0.1" and "post-conversion transmitting port: 2001."

Then, the NAPT function unit 31 refers to the NAPT table and converts the transmitting address (private IP address) and the port number included in the header of the received packet into a post-conversion transmitting address and a post-conversion transmitting port (that is, a global IP address and an allocated port number) (step S107).

Next, based on the destination address included in the header of the received packet, the NAPT function unit 31 performs the processes of steps S102 to S105 (step S108). With this configuration, when the number of current sessions of the group based on the destination address is greater than the number of available sessions, the transfer process can be restricted.

As described above, based on both of the transmitting address and the destination address, when the number of current sessions of each group is not greater than the available session numbers, the packet is transferred to the server 304 (step S109). Then, the communication from the HNW 301 to the server 304 is completed.

Figure 7:
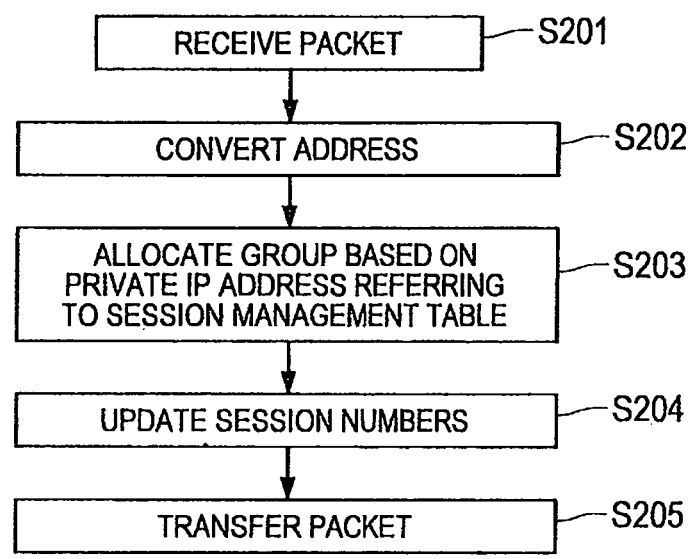
FIG. 7 is a flowchart showing a process in a packet transfer node according to the first embodiment.

Next, an operation of a process of the communication device 306 in case where a packet addressed to the HNW 301 is transmitted from the server 304 to the communication device 306 will be described. FIG. 7 is a flowchart showing a process in the function unit 308b of the packet transfer board 308.

When the packet from the server 304 is given to the packet transfer board 308b of the communication device 308 (step S201), the NAPT function unit 31 refers to the NAPT table and converts the destination address and the port number included in the header of the received packet from a global IP address and a port number into a private IP address and a port number (step S202).

For example, with reference to the example of the NAPT table shown in FIG. 4, since the destination address included in the header of the packet from the server 304 is a global IP address, the destination address and the port number of the packet correspond to the "post-conversion transmitting address" and the "post-conversion transmitting port" of FIG. 4. Thus, the address is converted into the "pre-conversion transmitting address" and the "pre-conversion transmitting port" corresponding to the "post-conversion transmitting address" and the "post-conversion transmitting port" as a private IP address and a port number.

Next, based on the private IP address converted by the NAPT function unit 31, the session management function unit 32 refers to the session management table and finds a group having the private IP address as a restriction address (step S203).

When the packet from the server 304 is a response to a session request from the terminal in the HNW 301 and the session between the terminal of the HNW 301 and the server 304 can be established, the session management function unit 32 updates the number of current sessions of the group in the session management table (step S204).

Then, the packet transfer board 308 transfers the packet having the converted private IP address and port number to the terminal in the HNW 301 (step S205).

(A-3) Effect of First Embodiment

As described above, according to the first embodiment, since the ISP communication device having an NAPT function controls to restrict the number of sessions available to each restriction address, the number of ports available to each user can be restricted so that chances to connect to the network can be fairly shared among the users. It is also possible to conserve global IP addresses.

(B) Second Embodiment

Next, a second embodiment of the packet transfer device, packet transfer method, packet transfer program and communication device according to the second embodiment of the present invention will be described with reference to the drawings.

Although fairness of network connection chances can be maintained among the users in the first embodiment, when the number of sessions reaches the number of available sessions allocated to each user, the user may not communicate with the server. However, when other users and the server do not communicate with each other, there is a margin in the process of the communication device. In this point of view, the second embodiment will describe a mechanism for effectively using the margin and maximizing the acceptance of communications with the server when there is the margin in the process of the communication device as described above.

(B-1) Configuration of Second Embodiment

The difference of the second embodiment from the first embodiment is the method of the process for restricting the number of sessions in the session management function unit of the packet transfer board. The second embodiment will describe the characteristic configuration of the session management function unit 32 in detail with reference to FIG. 8.

The session management function unit 32 is configured to perform the same function as that of the first embodiment. Further, the session management function unit 32 of the second embodiment is configured to set parent-child relations among the groups and manage the sessions using this parent-child relations.

FIG. 8 is a configuration diagram showing a configuration of a session management table included in the session management function unit 32 of the second embodiment.

In FIG. 8, the session management table of the second embodiment includes an item of "parent number" in addition to the items of the session management table of the first embodiment shown in FIG. 5.

In the "parent number," group numbers indicating parent groups of the groups are stored. For example, in FIG. 8, the parent group of the "group #1" is "group #4."

Here, similarly to other child groups; in the parent group, "available session numbers" are set and sessions are restricted when the "current session numbers" becomes greater than the "available session numbers." Further, when a session restriction for the child groups is performed and the "current session numbers" of the parent group is not greater than the "available session numbers," sessions in the parent group can be used. In the "available port range," ports can be dynamical allocated.

Here, in FIG. 8, the "restriction address" shows global IP addresses; however, private IP addresses of plural child groups may be registered, respectively.

When a process for restricting the number of sessions, the session management function unit 32 firstly determines whether or not to restrict the sessions based on the information of the child group similarly to the first embodiment. When the restriction of the sessions regarding the child group is performed, the session management function unit 32 refers to the "parent number" and acquires the information of the parent group. After that, the session management function unit 32 determines whether or not to restrict the session based on the information of the parent group.

With such a configuration, when the restriction of the sessions regarding the child group is performed, since the restriction of sessions is performed using the information of a parent group, the entire transfer process can be efficiently performed and the acceptability of the communications with the server can be maximized.

It is noted that an integrated number of available sessions corresponds to the session number in the parent group of the parent-child relations.

(B-2) Operation of Second Embodiment

Next, an operation of a process in the communication device 306 according to the second embodiment will be described with reference to the drawings. The following description will exemplify a communication from the terminal in the HNW 301 or 302 to the server 304.

Figure 9:
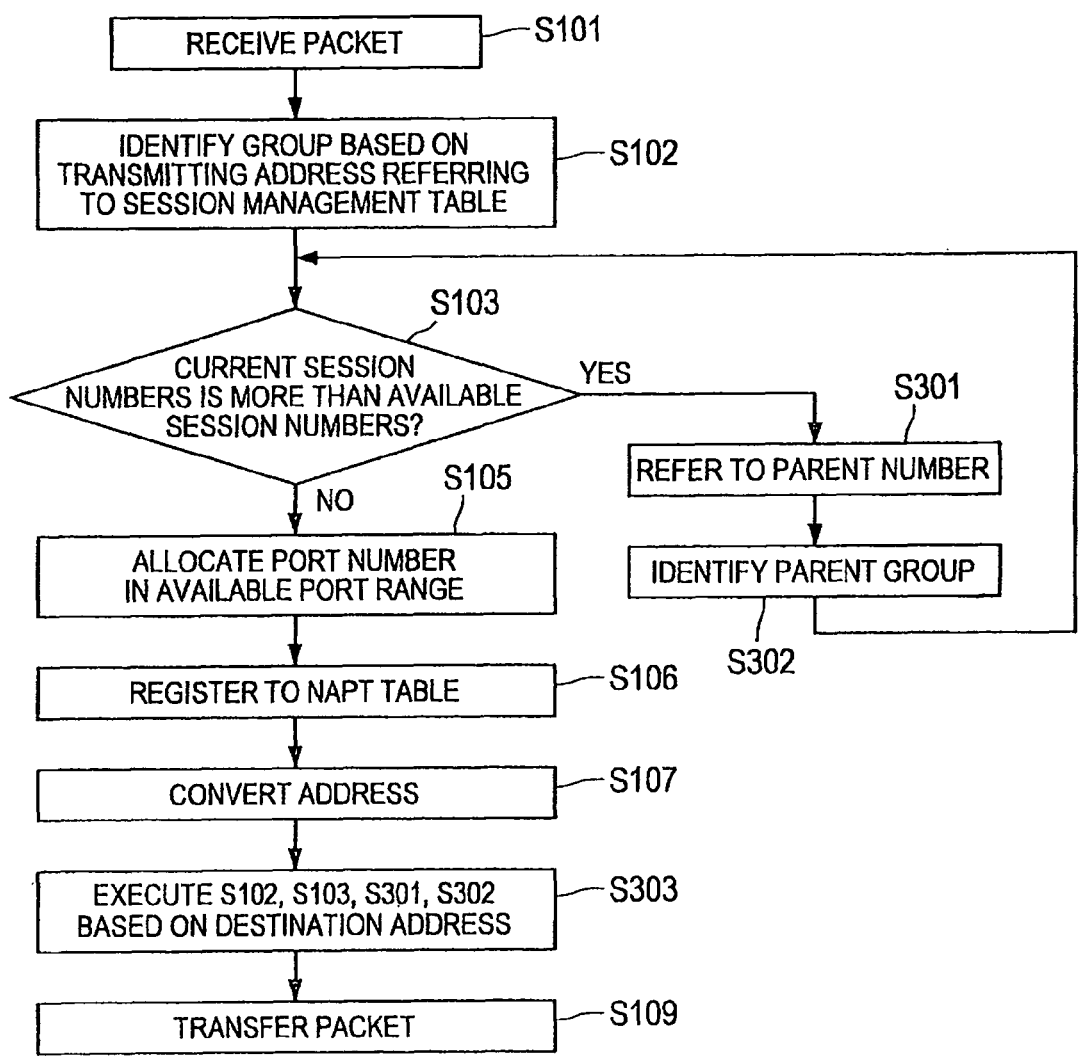
FIG. 9 is a flowchart showing a process in a packet transfer board according to the second embodiment.

FIG. 9 is a flowchart showing a process in the packet transfer board 308 according to the second embodiment.

Firstly, when a packet transmitted from the HNW 301 or 302 is given to the packet transfer board 308 of the communication device 306 (step S101), similarly to the first embodiment, the session management function unit 32 finds a group in the session management table based on the transmitting address included in the header of the received packet (step S102).

In step S103, when the number of current sessions of the group is not greater than the number of available sessions, the session management function unit 32 performs the process described in the first embodiment (steps S105 to S109).

For example, regarding the group #1 of the address of the HNW 301 in FIG. 8, since the number of current sessions (100) is not greater than the number of available sessions (500), the session management function unit 32 performs the process of the packet from the HNW 301 according to steps S105 to S108.

On the other hand, when the number of current sessions of the group is greater than the number of available sessions in step S103, the session management function unit 32 refers to the "parent number" of the group (step S301) to identify a parent group (step S302).

Then, the process proceeds to step S103 and the session management function unit 32 performs a restriction process of session numbers based on the information of the parent group.

For example, when a packet from the HNW 302 is given to the packet transfer board 308, regarding the group #2 of the address of the HNW 302, since the number of current sessions (500) is equal to the number of available sessions (500), the new session will make the number of current sessions greater than the number of available sessions. Thus, the session management function unit 32 refers to the "parent number: #4" of the group #2 to find the information of the group #4.

Then, based on the information of the group #4, since the number of current sessions (1000) is not greater than the number of available sessions (10000), the session management function unit 32 allocates a port number and registers the port number to the NAPT table. The NAPT function unit 31 converts the private IP address and the port number into the virtual IP address (global IP address and port number) which is registered in the NAPT table so that the communication to the server 304 can be realized.

Here, in step S303, based on the destination address included in the header of the received packet, processes of steps S102, S103, S301 and S302 are performed (step S303). With this configuration, when the number of current sessions of the group based on the destination address is greater than the number of available sessions, the transfer process can be restricted.

As described above, regarding both of the transmitting address and destination address, when the number of current sessions of each group is not greater than the number of available sessions, the packet is transferred to the server 304 (step S109). As a result, a communication from the HNW 301 to the server 304 is completed.

(B-3) Effect of Second Embodiment

As described above, according to the second embodiment, even when the number of sessions which users can connect is restricted, the ISP allows the users connect the network if there is a margin in the number of sessions which can be processed by the server. Therefore, the fairness among the users is maintained and the acceptability of communications with the server is maximized.

The control units and the NAPT and session management function units of the first and second embodiments can be implemented using one or more computers or microprocessors.

(C) Other Embodiments

According to the above described first and second embodiments, communications between IPv4-IPv4 communication protocols have been considered and the description exemplifies the case where the IPv4-IPv4 communication protocols are applied; however, communications between other protocols such as IPv4-IPv6, IPv6-IPv4, and IPv6-IPv6 communication protocols may be applied.

It should be understood by those skilled in the art that various modifications, combinations, sub-combinations and alterations may occur depending on design requirements and other factors insofar as they are within the scope of the appended claims or the equivalents thereof.

For example, the present invention can be applied to a device having network address conversion function between private IP address and global IP address for connection to IP network, and it is particularly preferable to a device which conserves the usage of global IP addresses by an Internet company via IP network.

The present application contains subject matter related to that disclosed in Japanese Priority Patent Application JP 2008-272360 filed in the Japan Patent Office on Oct. 22, 2008, the entire content of which is hereby incorporated by reference.

What is claimed is:

1. A packet transfer device for transferring packets between a plurality of private networks and a global network, the packet transfer device comprising:

first means for allocating a global address to a plurality of private addresses of the plurality of private networks, converting address information and a port number included in a header of a received packet, and transferring the received packet to a destination having the converted address information and port number; and second means, including a section management table in which a number of available sessions between a user terminal in the plurality of private networks and a device in the global network is set for each of a plurality of groups including one or more private addresses, for managing the number of current sessions between the user terminal and the device in the global network, wherein the second means accepts sessions between user terminals in the respective groups and the device in the global network if the total number of current sessions of a parent group of the plurality of groups is not greater than a predetermined number even when the number of current sessions of each group is greater than the number of available sessions for the respective group.

2. The packet transfer device according to claim 1, wherein the session management table sets an integrated number of available sessions available in the parent group, and the second means accepts a new session between one of the user terminals in one of the groups and the device in the global network if the number of current sessions of each group is not greater than the integrated number of available sessions even when the current session numbers of said one of the groups is greater than the number of available sessions for said one of the groups.

* * * * *